July 20, 1943.　　　　O. DEKKER　　　　2,324,681
ADJUSTABLE TRACTOR WHEEL MOUNTING MEANS
Filed May 26, 1941
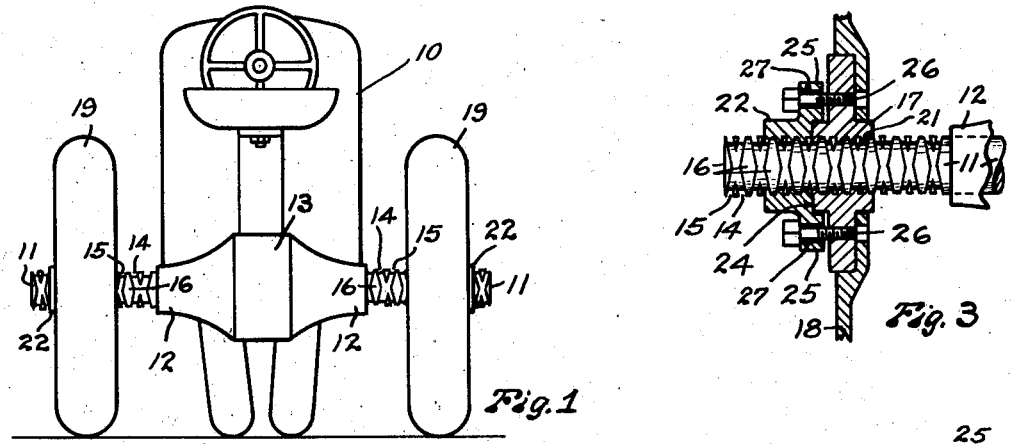
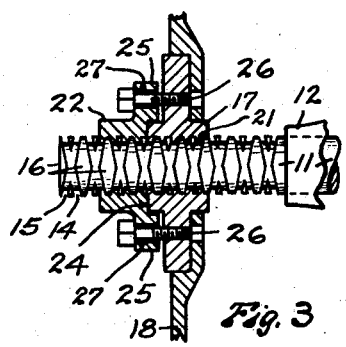
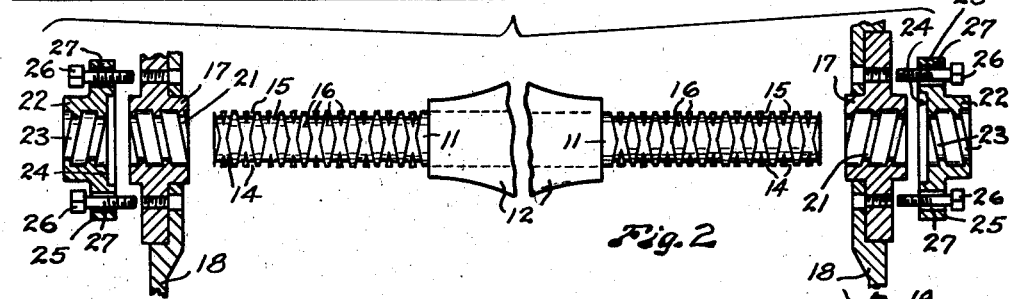
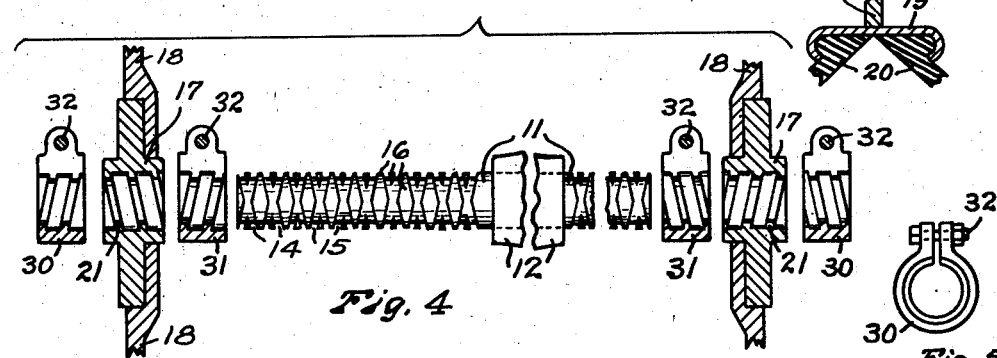
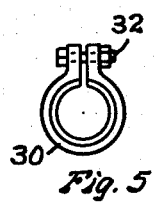
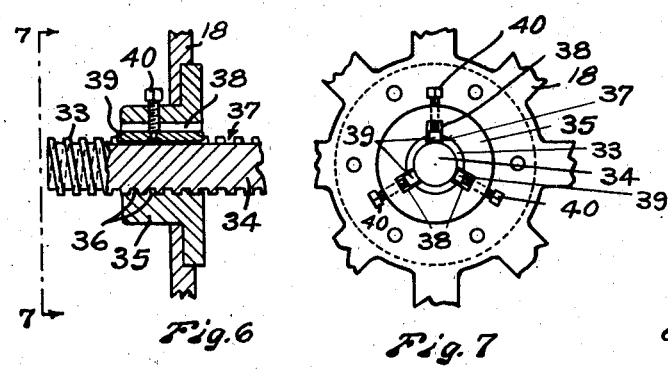
INVENTOR
*Otto Dekker*
BY
*Fred C. Matheny*
ATTORNEY Patented July 20, 1943

2,324,681

UNITED STATES PATENT OFFICE 2,324,681

ADJUSTABLE TRACTOR WHEEL MOUNTING MEANS

Otto Dekker, Granger, Wash.

Application May 26, 1941, Serial No. 395,228

6 Claims. (Cl. 301—128)

This invention relates to an adjustable tractor wheel mounting means and the object of this invention is to provide a simple, efficient and easily manipulated tractor wheel mounting means by which the driven rear wheels of a tractor may be mounted on the tractor axles in such a manner that the said wheels can be quickly and easily adjusted toward and away from each other to adapt the tractor to be used with row crops where the rows are spaced different distances apart.

Tractors are much used in the planting and cultivation of row crops and it is common practice, in planting, to space the rows of different crops different distances apart. For this reason it is often desirable and necessary to adjust the rear tractor wheels closer together or further apart, depending on the distance apart of the crop rows. To provide for this the rear wheels of present day tractors are usually adjustably splined or keyed on the driven rear axles of said tractors, and, while they can be adjusted, it is usually a difficult and time consuming job to loosen them up and move them inwardly or outwardly on the axles. Often it takes as much as half of one day's time to adjust a pair of these tractor wheels.

It is an object of my invention to provide means for mounting tractor wheels on the driven axles of tractors in such a manner that said wheels may be quickly and easily adjusted, thereby conserving the time of the driver, relieving him of needless labor and making it possible to keep the tractor usefully employed a larger percentage of the time.

In accordance with my invention I thread the hub portions of the rear tractor wheels onto the driven axles of the tractor and provide locking means therefor so that said rear tractor wheels can be moved longitudinally on their axles by loosening the locking means and then driving the tractor forwardly or rearwardly.

Preferably I provide, on the outer end portion of each rear tractor axle member double threads, i. e. one right hand thread and one left hand thread, that cross each other. Also I provide in the hub portion of each tractor wheel, a single thread that is adapted to interfit with one of the double threads on the tractor axle. Also I provide for each axle, one or more nuts having internal threads spiraling in the opposite direction from the threads in the tractor wheel hub with which they cooperate, whereby the said hubs and nuts will be jammed against each other when a force is exerted tending to turn the axle in one direction thereby securely locking the tractor wheels on the axles.

Other objects of this invention will be apparent from the following description taken in connection with the accompanying drawing.

In the drawing Figure 1 is a somewhat diagrammatic rear elevation of a tractor having adjustable tractor wheel mounting means constructed in accordance with my invention.

Fig. 2 is an exploded view, partly in section and partly in elevation and with parts broken away, showing the rear tractor axle members, wheel hubs and nuts that go to make up this invention, the hubs and nuts being shown removed from the axles and parts of the wheels being broken away.

Fig. 3 is a view partly in section and partly in elevation showing a fragment of one of the tractor axles with a tractor wheel hub and lock nut in locked position thereon.

Fig. 4 is a view partly in section and partly in elevation and with parts broken away, showing a tractor axle, wheel hub and two split nuts, the said nuts constituting locking means of modified form.

Fig. 5 is a detached elevation of one of the split nuts shown in Fig. 4.

Fig. 6 is a fragmentary view, partly in section and partly in elevation of a modified form of this invention using a single thread and a modified form of locking means.

Fig. 7 is a view in elevation taken substantially on broken line 7—7 of Fig. 6.

Like reference numerals designate like parts throughout the several views.

The drawing shows a tractor 10 having rear axle members 11 journaled in frame means 12 and extending in opposite directions from a differential housing 13 within which is provided the usual differential gear mechanism, not shown.

In accordance with my invention I provide, on the outer end portion of each tractor axle member 11, two threads 14 and 15 which traverse the same portion of the axle and spiral in opposite directions and cross each other at frequent intervals, one of said threads being right hand and the other being left hand.

In practice, the pitch of the threads 14 and 15 is great enough so that strong and substantial lands 16 are left between these threads. On an axle three inches in diameter I find it satisfactory to construct the intersecting threads with one turn to the inch. Usually on an axle of this diameter sufficient wheel adjustment is provided by threading about twelve inches of the outer end portion of each axle member.

The tractor wheels comprise hub portions 17, spoke portions 18 and rim portions 19 for receiving tires 20. Obviously this invention will operate in the same manner irrespective of whether the wheels have pneumatic or non-pneumatic tires. The hubs 17 of the wheels on opposite sides of the tractor have internal threads 21 that spiral in opposite directions, one of said hubs 17 having a right hand thread and the other hub 17 having a left hand thread, as best shown in Fig. 2. Preferably these threads are arranged so that when the axles 11 are rotated in a direction tending to move the tractor forwardly the threads will tend to move the wheels outwardly on the axles and when the axles 11 are rotated in a direction tending to move the tractor rearwardly the threads will tend to move the tractor wheels inwardly on the axles.

The hubs 17 of the two rear tractor wheels being internally threaded in opposite directions will interfit with oppositely pitched threads on the two axle members 11 so that when the locking means is released and the two axles 11 are both rotated in the same direction the two tractor wheels will both be moved outwardly or will both be moved inwardly on their axles, depending on the direction of rotation of the axles.

At least one nut 22 is provided for cooperation with each tractor wheel hub 17 to lock the hub in any desired position on the axle. Each nut 22 has an internal thread 23 that is pitched in the opposite direction from the thread 21 in the tractor wheel hub with which it cooperates. Each nut 22 has a portion 24 adapted to abut against the end portion of a tractor wheel hub 17 and has a flange 25 adapted to be secured by cap screws 26 to the adjacent wheel hub 17. Insertion of the cap screws 26 is facilitated by making the holes 27 in the flanges 25 larger than said cap screws. Thus the holes 27 do not have to register accurately with the threaded holes in the hubs in order for the cap screws to be inserted.

Each hub 17 will interfit with one thread on its axle member and the nut 22 which cooperates therewith will interfit with an oppositely pitched thread of the same axle member. Consequently when a hub 17 and a nut 22 are positioned in abutting relation on an axle 11 and secured together, as by the cap screws 26, they will be firmly locked on said axle so that the axle can not be rotated in the hub and nut and the hub and nut can not be rotated on the axle but will rotate with the axle.

With the construction just described it will be apparent that when force is applied tending to rotate an axle 11 in one direction in a hub 17 and nut 22 it will tend to jam the hub and nut together and when force is applied tending to rotate said axle in the opposite direction in said hub and nut it will tend to separate said hub and nut. Obviously when a hub and a nut are jammed together on an axle and are secured against separation by the cap screws 26 they can neither be moved toward each other or away from each other and the axle and wheel must rotate as a unit.

To adjust the tractor wheels on the axles 11 the cap screws 26 are first removed. If the tractor wheels are to be moved outwardly on the axles the nuts 22 are preferably moved outwardly and positioned with their inner ends at the locations where the outer ends of the wheel hubs are to be stopped. These nuts will remain in the positions in which they are thus set irrespective of rotation of the tractor axles. The tractor is then driven in the proper direction (preferably forwardly), to move the wheels outwardly as the tractor operates and while the wheels are moving over the ground. As the tractor moves, the threads in the axles will move the wheels slowly outwardly on the axles until the outer end portions of the wheel hubs jam against the nuts and are locked against further outward movement. The cap screws 26 may then be inserted thus locking the wheels and nuts against inward movement on the axle members.

If the tractor wheels are to be adjusted inwardly on the axles the cap screws are removed and the tractor driven in the proper direction (preferably rearwardly), to move the wheels inwardly on the axles. The driver can watch the inward movement of the wheels on the axles, and when the wheels reach the proper positions on the axles, as determined by observation, the driver can stop the tractor, move the nuts 22 into abutting relation against the wheel hubs and insert the cap screws 26.

If the two tractor wheels do not move inwardly at the same rate of speed when they are being adjusted inwardly the one that reaches its desired position first may be locked on its axle member and the other then moved to its desired position by further operation of the tractor and locked.

In the manner above described the tractor wheels may be very quickly and easily adjusted inwardly or outwardly on the driven axle members of the tractor and much valuable time can be saved where a tractor is being used on different fields having crop rows spaced different distances apart.

Figs. 4 and 5 show a modified form of this invention in which the wheel hub and axle are the same as those shown in Figs. 1, 2 and 3 and hereinbefore described and in which two nuts 30 and 31 are provided at opposite ends of the hub 17 respectively. Each nut 30 and 31 is preferably split and is provided with a bolt 32 by which it may be clamped onto an axle 11.

With the structure shown in Figs. 4 and 5, rotation of an axle 11 in one direction will tend to jam a hub 17 against one of the nuts 30 or 31 while rotation of the axle 11 in the opposite direction will tend to jam the hub 17 against the other nut 30 or 31. When the two nuts 30 and 31 are positioned against opposite ends of the hub 17, as shown in Fig. 4, the hub will be securely locked against movement in both directions.

With the structure shown in Figs. 4 and 5 a wheel may be adjusted inwardly or outwardly on an axle member by moving one of the nuts 30 or 31 away from the hub to the desired position, clamping the nut so moved onto the axle, driving the tractor in the proper direction and far enough to jam one end of the hub 17 against the nut so moved and then moving the other nut 30 or 31 against the other end of the wheel hub 17 and clamping it onto the axle.

Figs. 6 and 7 show a modified form of the invention in which I provide a single thread 33 on the respective outer end portions of the driven axle or axle members of a tractor. The threads 33 at the two ends of the axle members 34, Figs. 6 and 7, are right and left hand threads respectively. A wheel hub 35 having an internal thread 36 therein is threaded onto each axle thread 33. Each axle member 34 has keyways 37 and each wheel hub has keyways 38. Keys 39 are provided in the keyways 37 and 38. The keyways 38 in the hub 35 are deep enough so that the keys 39 may be withdrawn entirely into these keyways 38 in the hub and clear of the keyways 37 in the axle. Screws 40 are provided for moving said keys 39 radially inwardly and outwardly in the keyways 37 and 38.

When the keys 39 are in both sets of keyways 37 and 38 they will lock the axle 34 and hub 35 against relative rotation, and, at the same time, the threads 33 and 36 will prevent relative endwise movement of said axle and hub. When the keys 39 are withdrawn clear of the keyways 37 in the axle 33 and the tractor is driven the cooperating threads 33 and 36 on the axle and the hub will adjust the tractor wheel longitudinally of the driven tractor axle.

The foregoing description and accompanying drawing clearly set forth what I now regard as a preferred embodiment of my invention but it will be understood that this disclosure is illustrative and that such changes in the device may be made as are fairly within the scope and spirit of the appended claims.

I claim:

1. In a tractor, a driven axle having right and left hand threads provided on the same portion thereof in relatively crossed relation; a wheel hub having threads interfitting one set of threads on said axle; and nut means interfitting the other set of threads on said axle locking said wheel hub against rotation relative to said axle.

2. In a tractor, a driven axle having right and left hand threads provided on the same portion thereof in relatively crossed relation; a wheel hub having threads interfitting one set of threads on said axle; nut means interfitting the other set of threads on said axle; and means adapted to secure said nut means to said wheel hub.

3. In a tractor, a driven axle having right and left hand threads provided on the same portion of said axle in relatively crossed relation; a wheel hub; threads in said wheel hub interfitting one set of threads on said axle; nut means; threads in said nut means adapted to interfit the other set of threads on said axle; and screw means adapted to secure said nut means and said wheel hub together and thereby lock said wheel hub and said axle against relative rotation.

4. In a tractor, driven transverse axle means adapted to receive a tractor wheel on each end portion thereof; two sets of oppositely pitched threads provided on the two outer end portions of said axle means, the two threads of each set being on the same portion of the axle member and being relatively crossed on the axle member; two tractor wheels; two wheel hubs in said wheels; right and left hand threads respectively in said wheel hubs adapted to be threaded onto the respective end portions of said axles; two nuts; and right and left hand threads in said nuts respectively adapted to screw onto the threads on the outer end portions of said axle means, the thread in each nut being pitched in the opposite direction from the thread in the adjacent hub.

5. In a tractor, a driven axle; right and left hand threads provided on the same portion of said axle in relatively crossed relation; a wheel hub; threads in said wheel hub interfitting one of the threads on said axle; two nut members positioned on opposite sides of said wheel hub; and threads in said nut members of opposite pitch from the thread in said wheel hub and adapted to cooperate with the thread on said axle that is oppositely pitched from the thread with which said wheel hub thread cooperates, whereby when said nuts are jammed against opposite sides of said wheel hub said wheel hub and said axle will be locked against relative rotation.

6. In a tractor, a driven axle; right and left hand threads provided on the same portion of said axle in relatively crossed relation; a wheel hub; a thread in said wheel hub interfitting one of the threads on said axle; two nut members positioned on opposite sides of said wheel hub, said nuts being radially split on one side of the center thereof to provide for expansion and contraction of the nuts, threads in said nuts of opposite pitch from the thread in said wheel hub and adapted to interfit a thread on said axle; and screw means adapted to clamp said split nuts to said axle.

OTTO DEKKER.